US012559805B2

(12) United States Patent
Rovetti

(10) Patent No.: US 12,559,805 B2
(45) Date of Patent: Feb. 24, 2026

(54) METHOD FOR PRODUCING A MULTILAYER LAMINAR PRODUCT AND PLANT FOR IMPLEMENTING SAID METHOD

(71) Applicant: COS.T.A. S.R.L., Montebello Vicentino (IT)

(72) Inventor: Mariano Rovetti, Montorso Vicentino (IT)

(73) Assignee: COS.T.A. S.R.L., Montebello Vicentino (IT)

( * ) Notice: Subject to any disclaimer, the term of this patent is extended or adjusted under 35 U.S.C. 154(b) by 219 days.

(21) Appl. No.: 18/554,566

(22) PCT Filed: Nov. 15, 2022

(86) PCT No.: PCT/IB2022/060977
§ 371 (c)(1),
(2) Date: Oct. 9, 2023

(87) PCT Pub. No.: WO2023/089477
PCT Pub. Date: May 25, 2023

(65) Prior Publication Data

US 2024/0190122 A1 Jun. 13, 2024

(30) Foreign Application Priority Data

Nov. 17, 2021 (IT) ........................ 102021000029126

(51) Int. Cl.
*C14B 1/56* (2006.01)
*C14B 17/06* (2006.01)
(Continued)

(52) U.S. Cl.
CPC ................ *C14B 1/56* (2013.01); *C14B 17/06* (2013.01); *C14C 11/003* (2013.01); *C14C 15/00* (2013.01)

(58) Field of Classification Search
CPC ......... C14B 1/56; C14B 17/06; C14C 11/003; C14C 15/00
See application file for complete search history.

(56) References Cited

U.S. PATENT DOCUMENTS 4,145,240 A * 3/1979 Polzin .................. B32B 29/005 156/224
7,378,143 B2 * 5/2008 Schneider ........... B32B 37/0007 428/161
(Continued)

FOREIGN PATENT DOCUMENTS

EP 3 464 652 A1 4/2019
EP 3 589 489 A1 1/2020
(Continued)

OTHER PUBLICATIONS

International Search Report and Written Opinion dated Mar. 1, 2023, Issued in PCT Application No. PCT/IB2022/060977, filed Nov. 15, 2022.

*Primary Examiner* — Nahida Sultana
(74) *Attorney, Agent, or Firm* — Workman Nydegger

(57) ABSTRACT

A method for producing a multilayer laminar product includes the operations of providing a laminar support, covering a first face of the laminar support with a first covering layer in a polymer resin and consolidating, at least partially, the covering layer. The method further envisages providing, above the first covering layer, a laminar element free of any protective film. The method further envisages pushing an embossed surface against the first covering layer with interposition of the laminar element and causing the polymerization of the first covering layer.

6 Claims, 6 Drawing Sheets

(51) Int. Cl.
*C14C 11/00* (2006.01)
*C14C 15/00* (2006.01)

(56) References Cited

U.S. PATENT DOCUMENTS

| | | | | |
|---|---|---|---|---|
| 12,024,817 | B2 * | 7/2024 | Min | D06N 3/0077 |
| 2018/0099594 | A1 * | 4/2018 | Min | B32B 5/02 |
| 2018/0281364 | A1 * | 10/2018 | Uemura | B32B 37/12 |

FOREIGN PATENT DOCUMENTS

| | | |
|---|---|---|
| EP | 3 862 444 A1 | 8/2021 |
| IT | VI2005A000080 | 9/2006 |

* cited by examiner

METHOD FOR PRODUCING A MULTILAYER LAMINAR PRODUCT AND PLANT FOR IMPLEMENTING SAID METHOD

BACKGROUND OF THE INVENTION

1. The Field of the Invention

The present invention relates to a method for producing a multilayer laminar product particularly suitable for ennobling leathers.

The present invention also relates to a plant for implementing the aforesaid method.

2. The Relevant Technology

As is well known, so-called “ennobling” processes are used in the leather processing sector allowing to increase the commercial value of low-grade leather.

In fact, one of the first stages of leather processing consists in separating the most valuable outer layer, called “grain” in jargon, from a less valuable lower layer, which in turn is eventually divided into further layers. In the following, the term “leather” will mean not only a leather in its entirety, but also and above all any of the layers obtained from it, in particular the less valuable ones.

Basically, an ennobling process of known type envisages covering the surface of the leather intended to be visible during use with a layer of plastic material, generally polyurethane. The aforesaid layer allows to cover the superficial defects of the leather and to give it a similar appearance to that of a more valuable leather.

A similar process can also be used to give a fabric, synthetic or otherwise, a leather-like appearance, in which case we speak of “imitation leather”. Obviously, what will be described below is also fully applicable to the latter process.

Generally, during the ennobling process an embossing is also printed on the surface of the product, in order to achieve special aesthetic effects that contribute to increasing the value of the product.

A technique of known type suitable for ennobling leathers, described in Italian patent application VI2005A000080 on behalf of the Applicant of the present invention, envisages covering a laminar support, for example a leather to be ennobled, with a layer of polyurethane resin.

Subsequently, an embossed paper is compressed against the layer of polyurethane resin that has not been fully polymerized and, therefore, still has a soft consistency, in order to imprint the pattern of the embossed paper on this layer.

The technique then envisages polymerizing the polyurethane resin so as to make it adhere stably to the laminar support.

After the resin has been polymerized, the embossed paper is removed from the laminar support so as to obtain the final product. To facilitate the removal of the paper and prevent it from adhering to the polyurethane resin, the embossed paper is previously covered with a protective film, also made of polyurethane, which prevents direct contact between the polyurethane resin and the embossed paper. This film becomes an integral part of the polyurethane resin during the polymerization described above.

The aforesaid known technique has some recognized drawbacks.

A first drawback stems from the fact that the width of the plant, and therefore the width of the treatable leather, is conditioned by the width of the commercially available embossed paper, which usually does not exceed 2000 mm.

This aspect is limiting, considering that some leathers reach up to 3500 mm and above. In order to use the technique described above with such wide leathers, it is necessary to cut the latter according to their longitudinal direction so as to obtain strips of width less than the width of the paper, which are processed one after the other.

The aforesaid known technique has the further disadvantage that the embossed papers available on the market are not provided with the protective film, which therefore must be made in the same leather ennobling plant. In ennobling plants of the known type, the film is made by applying a thin layer of polyurethane resin to the paper, for example by spreading with a blade, spreading with a cylinder, spraying with guns, etc. The resin is then made to solidify in the furnace to obtain the film.

It is understood that the aforesaid operation has the disadvantage of affecting the cost of the process and the overall size of the plant.

A further drawback of the known technique described above is related to the cost of the embossed paper, accentuated by the fact that the paper must have an adequate pulp and grammage to withstand the mechanical, chemical and thermal stresses produced during processing. Evidently, the cost of the embossed paper affects the cost of the manufacturing process.

To limit the costs related to the embossed paper, downstream of the polymerization process there is a device that removes the portion of film left on the embossed paper so that it can be reused. However, the aforesaid device contributes to the increase in the overall size and costs of the plant, as well as in the costs of the process.

A further drawback of the above-described technique stems from the fact that the embossed paper requires periodic replacement, contributing to further increase the process costs.

SUMMARY OF THE INVENTION

The present invention aims to overcome all the above-mentioned drawbacks inherent in the ennobling technique of known type described above and the related plants.

In particular, it is an object of the present invention to realize a method for producing a multilayer laminar product, in particular of ennobled leathers, which allows the processing of products with widths greater than those allowed by the known technique described above.

It is also an object of the present invention to propose a method for producing a multilayer laminar product, the implementation of which is less expensive than analogous methods belonging to the prior art.

In particular, it is an object of the present invention to avoid the use of embossed paper.

This object also makes it possible to obtain plants for the implementation of the aforesaid method, which are less complex and therefore less expensive and more reliable than plants for the implementation of methods belonging to the prior art.

The aforesaid objects are achieved by a method for producing a multilayer laminar product, in particular an ennobled leather, according to the claims.

The aforesaid objects are also achieved by a plant for producing the aforesaid multilayer laminar product according to the claims.

Further detailed features of the invention are given in the dependent claims.

Advantageously, the technique of the invention makes it possible to process high-width leathers.

This advantageously makes it possible to obtain products intended for fields of application outside the scope of the products obtained by the known technique.

In addition, advantageously, the possibility of processing the leathers without cutting them avoids producing waste of raw material.

Therefore, it is understood that the technique of the invention is particularly suited to the processing of valuable leathers of considerable sizes.

Still advantageously, the fact of not using embossed paper allows reducing the costs related to the latter.

In particular, the absence of processes and devices for depositing the protective film on the paper and for removing it allows to reduce the costs and the overall size of the plant, as well as the costs of processing.

BRIEF DESCRIPTION OF THE DRAWINGS

The aforesaid objects and advantages, together with others that will be mentioned hereinafter, will appear as clear during the following description of a preferred embodiment of the invention, which is given by way of non-limiting example with reference to the accompanying drawings, where.

DETAILED DESCRIPTION OF THE PREFERRED EMBODIMENTS

The method of the invention for producing a multilayer laminar product, subsequently indicated with 6, particularly suitable for ennobling leathers, envisages providing a laminar support, indicated in FIG. 1 and FIG. 2 with 1. Preferably, the laminar support 1 is a leather, but the method of the invention can also be applied to other laminar supports, in particular to fabrics, synthetic or otherwise.

Figure 3:
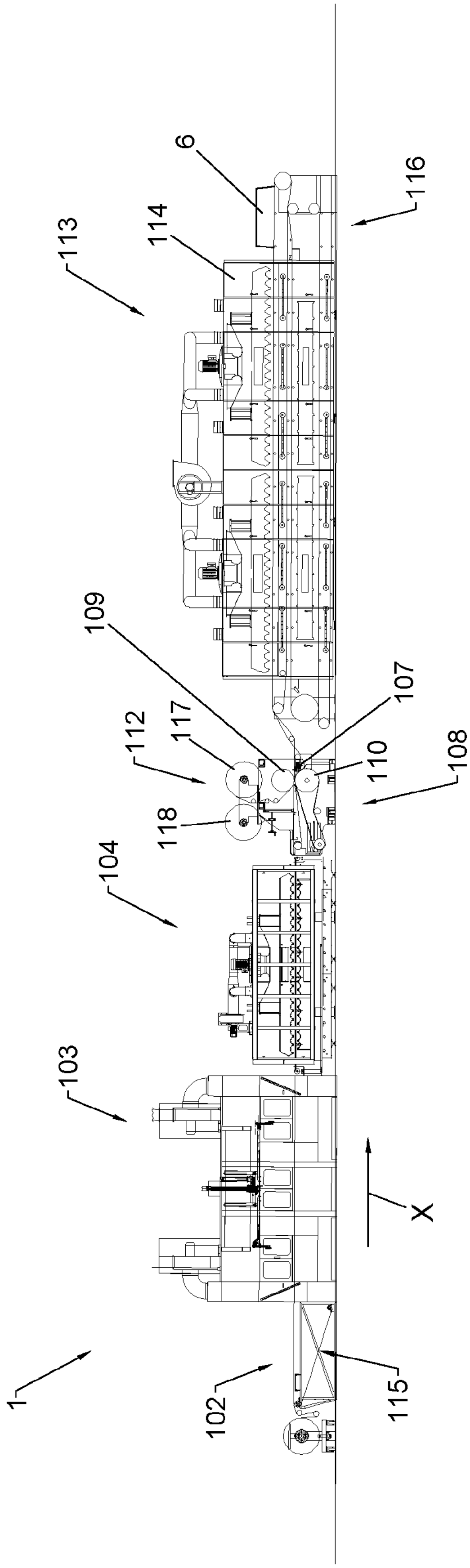
FIG. 3 represents the plant of the invention, in side view, according to the aforesaid first preferred embodiment.

Preferably but not necessarily, the laminar support 1 is advanced in a plant 100, represented according to the preferred embodiment in FIG. 3, according to an advancement direction X at a predetermined advancement speed by a first feed device 102. Preferably, the aforesaid first feed device 102 comprises a flexible element closed in a loop around a series of cylinders, on which the laminar support 1 is rested and which is advanced according to the aforesaid advancement direction X.

As for the advancement speed, preferably but not necessarily it is in the range between 5 and 20 metres per minute, even more preferably between 8 and 14 metres per minute.

Figure 1:
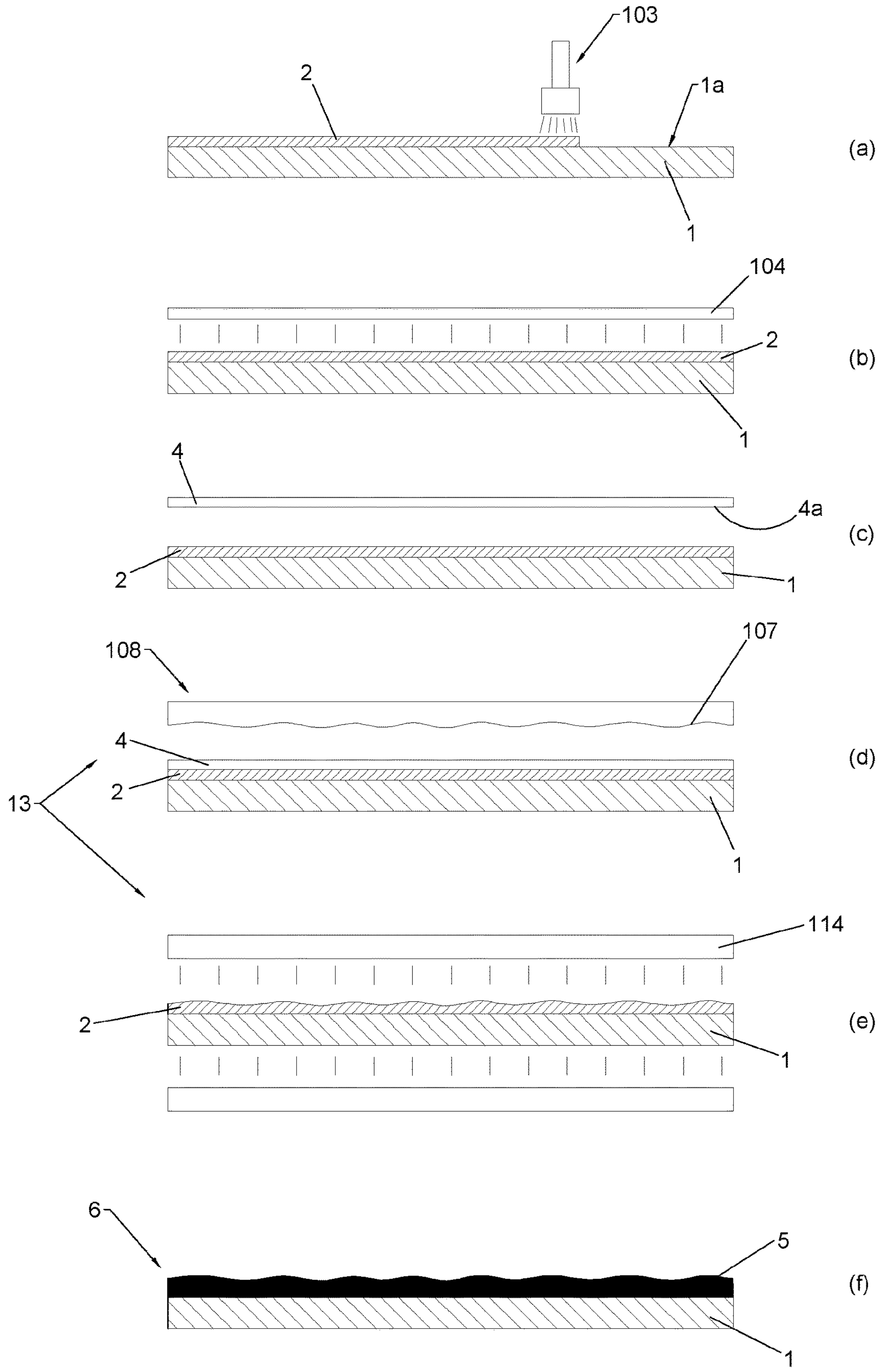
FIGS. 1(*a*)-1 (*f*) schematically represent different steps of the method of the invention according to a first preferred embodiment, in the application to a laminar support.

As can be seen in FIG. 1(*a*), according to a first preferred embodiment of the method of the invention, a first face 1*a* of the laminar support 1 is covered with a first covering layer 2 in a polymer resin, preferably but not necessarily comprising polyurethane.

Such polymer resin could alternatively be an epoxy or acrylic polymer resin or mixtures of acrylic, polyurethane or epoxy resins.

In addition, such resins could comprise additives in aqueous dispersion.

Still preferably, such polymer resin comprises pigments.

The first covering layer 2 of polymer resin is deposited on the laminar support 1, preferably by spraying or by spreading with a blade or a cylinder on the first face 1*a*, by means of a first applicator assembly 103 belonging to the plant 100. The first applicator assembly 103 may comprise a series of spray nozzles arranged in a circle, which are rotated around the axis of the circle so as to intersect in succession the trajectory of the laminar support 1, or which are moved with reciprocal motion and transversely to the trajectory of the laminar support 1. Alternatively or in combination with the aforesaid spray nozzles, the first applicator assembly 103 may comprise a doctor blade for spreading the polymer resin on the first face 1*a*.

Preferably, the amount of such resin of the first covering layer 2 is between 2 and 20 grams per square foot, more preferably this amount is between 7 and 12 grams per square foot.

It should be noted that the unit of measurement grams per square foot was deliberately used in describing the amount of resin spread on the laminar support, even if this unit of measurement does not belong to the international system of units of measurement. Such choice is due to the fact that, for all intents and purposes, the operators in the sector use this unit of measurement to define the aforesaid amount of resin. In any case, as known, it is wished to remind that a square foot corresponds to 929.03 $cm^2$. Therefore, if necessary, this amount of resin could also be expressed with the unit of measurement grams per $cm^2$, making the appropriate transformation of the above indicated values in grams per square foot into the respective values expressed in grams per $cm^2$.

As seen in FIG. 1(*b*), the method of the invention, following the operation of covering the first face 1*a* of the laminar support 1 with said first covering layer 2 in a polymer resin, envisages consolidating the latter, for example causing a slight polymerization, so as to give it a more compact consistency, similar to a gel, so as to obtain a consolidated covering layer. Preferably, partial consolidation takes place by heating with a first heater 104, for example a battery of infrared lamps or a ventilated dryer with diathermic oil, steam or gas heating.

Preferably, this step of partial consolidation of the first covering layer 2 by heating takes place at a temperature between 35° C. and 80° C., even more preferably between 45° C. and 70° C.

In addition, this step of partial consolidation envisages reducing the weight per square foot of the first covering layer 2 downstream of the first heater 104 by a percentage between 35% and 55% with respect to the weight per square foot of said first covering layer 2 upstream of the first heater 104.

In order to verify this weight reduction value, it is necessary to:

- weigh a square foot of the aforesaid laminar support 1 before applying the first covering layer 2, so as to define a tare;
- weigh upstream of the first heater 104 said square foot of the same laminar support 1 on which the first covering layer 2 is applied by means of the aforesaid first applicator assembly 103 and to subtract, from the latter value, the tare value;

weigh downstream of the first heater 104, or after the partial consolidation step, the square foot of the same laminar support 1 on which the first covering layer 2 is applied and to subtract, from the latter value, the tare value;

relate these last two weight values, without the tare, to verify the aforesaid weight reduction as a percentage of the second weight value with respect to the first.

According to the preferred embodiment of the invention, the method envisages providing above the first covering layer 2 a laminar element 4 provided with a first face 4*a*, as indicated in FIG. 1(*c*), so that said laminar element 4 is interposed between said first covering layer 2 and an embossed surface 107, during the subsequent pressing step of the method of the invention.

With regard to the laminar element 4, it must have sufficient yieldability to be able to transfer the embossing from the embossed surface 107 to the first covering layer 2. The property just mentioned is obtainable by choosing a material resistant enough to allow a very reduced thickness for the laminar element 4 and, at the same time, with a mechanical and thermal resistance compatible with the use in the aforesaid process.

It has been found that materials particularly suitable for use as a laminar element are polyethylene, nylon, polyester and other equivalent materials, which have a relatively low cost and adequate mechanical and thermal resistance even with very reduced thicknesses, for example between 5 microns and 50 microns, even more preferably between 8 microns and 30 microns, specifically with a thickness equal to 15 microns. It is also evident that, in embodiment variants of the invention, the laminar element 4 can be made of any other material, provided that it has the properties mentioned above.

It is clear that, since the embossed surface 107 is distinct from the laminar element 4, the latter does not have the same width constraints as the embossed papers available on the market.

In particular, since the embossing is imprinted on the first covering layer 2 by the embossed surface 107, while the laminar element 4 is used only and exclusively to avoid contact between the embossed surface 107 and the polymer resin, it is very advantageous to use a laminar element 4 with a smooth surface.

In fact, a smooth laminar element can be selected from a wide range of commercially available materials, including polyethylene or smooth nylon. This also allows choosing the laminar element 4, so as to minimize costs and/or maximize the quality of the multilayer product.

Furthermore, given the nature of the material of the laminar element 4 preferably used in the ennobling process subject-matter of the invention, given the thickness of the same laminar element 4 and the fact that its surface is a smooth surface, it is not necessary to apply on this surface, adapted to be placed in contact with the first covering layer 2 during the embossing operation, a polyurethane protective film, as instead required by the prior art. Therefore, according to the invention, said laminar element 4 is interposed between the first covering layer and the embossed surface 107, free of any type of protective film. In other words, said surface of the laminar element 4 does not undergo any covering treatment with said protective film, before the embossing operation is carried out.

Consequently, at the end of the ennobling process, cleaning said laminar element 4 from the residues remaining thereon of the aforesaid protective film is thus no longer necessary. Advantageously, therefore, thanks to the characteristics of the laminar element 4, used according to the invention, the proposed ennobling process, on the one hand allows to obtain an optimal ennobling result, and on the other hand allows to reduce the times for executing this process and the costs due to the use of embossed paper, as described above for the prior art.

Figure 5:
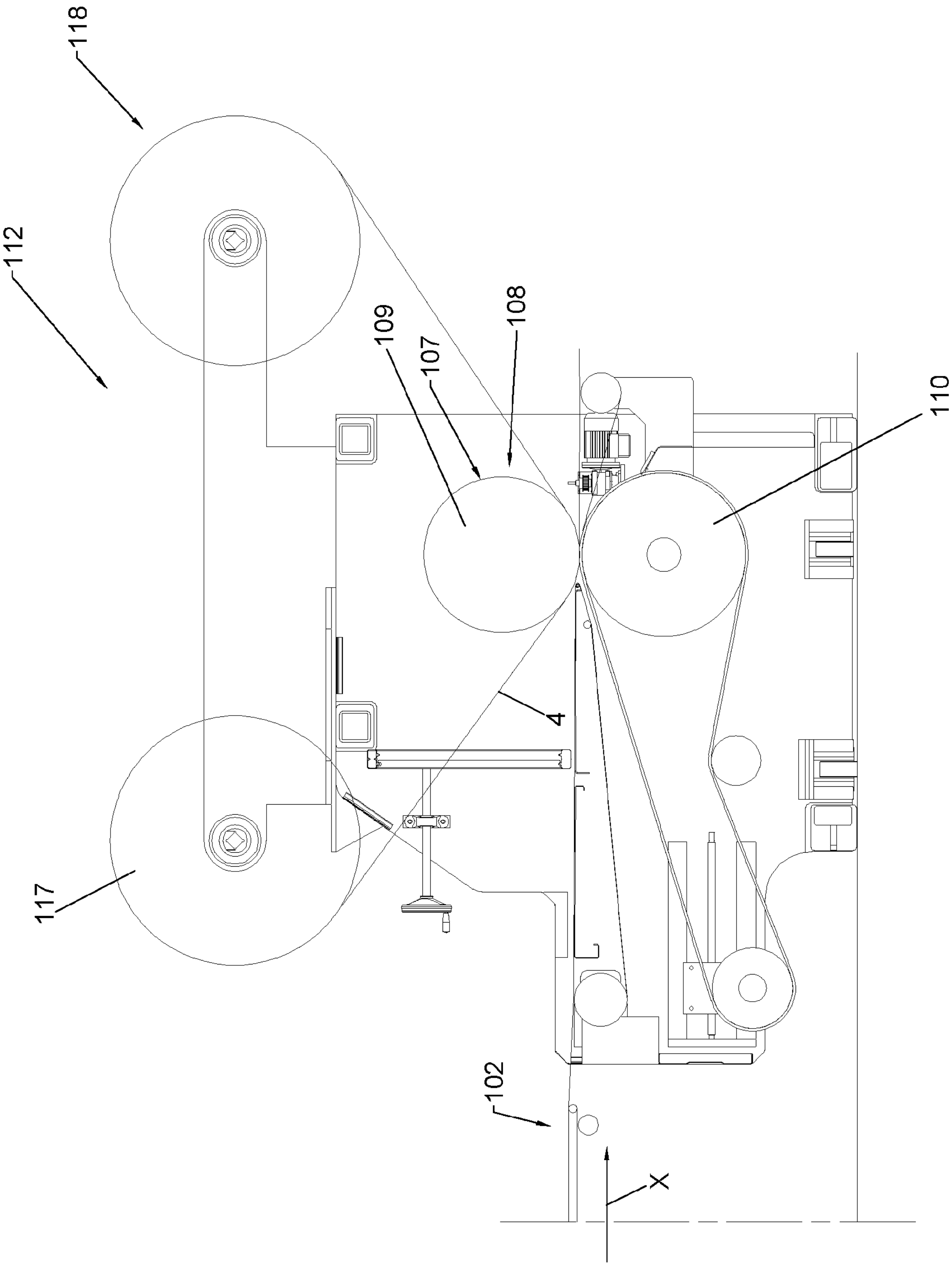
FIG. 5 represents a detail of the first preferred embodiment of the plant of FIG. 3.

Preferably, the plant 100, configured to allow the execution of such a preferred embodiment of the method of the invention, provides that the laminar element 4 is provided in the form of a tape and is advanced in the advancement direction X at a speed corresponding to the aforesaid advancement speed by a second feed device 112, visible in particular in the detail of FIG. 5.

Preferably, the second feed device 112 comprises a series of rollers that hold the laminar element 4 in tension and guide it according to a predefined trajectory, so as to bring it into contact with the laminar support 1.

Even more specifically, said feed device 112 comprises a first reel 117 from which said tape of laminar element 4 is unwound and a second reel 118 on which said tape is wound after use, said first and second reels 117 and 118 being defined on the plant 100 so that the tape constituting the laminar element 4 is interposed between the laminar support 1 and the embossed surface 107, when the thrust assembly 108 exerts the aforesaid thrust of the same embossed surface 107 against the second covering layer 3.

As already mentioned, subsequently, the embossed surface 107, arranged downstream of the first heater 104 according to the advancement direction X, is pushed against the first covering layer 2, with interposition of the laminar element 4, in a thrust assembly 108, as schematically represented in FIG. 1(*d*).

During the aforesaid thrust operation, the pattern of the embossed surface 107 is imprinted on the first covering layer 2, as schematically represented in FIG. 1(*e*). Preferably, the aforesaid thrust is performed with a pressure between 20 and 100 $kg/cm^2$ and, even more preferably, between 50 and 70 $kg/cm^2$. Advantageously, the aforesaid pressure is sufficiently limited so as not to substantially alter the properties of the laminar support 1, in particular its softness, which is very important in the event that the laminar support is leather.

Preferably and as can again be seen in FIG. 3, the embossed surface 107 belongs to an embossing cylinder 109, mounted rotatably around its axis. Advantageously, the aforesaid embossing cylinder 109 can be kept constantly resting on the laminar support 1 allowing a continuous process to be carried out. It is also evident that, in embodiment variants of the invention not represented in the figures, the embossed surface 107 may belong to a device other than the aforesaid embossing cylinder, such as for example a die, or whatever.

Preferably, the embossing cylinder 109 is made of steel and has a chromed surface, which gives it high chemical resistance.

Even more in detail, this embossed surface 107 of the embossing cylinder 109 has a roughness between 3 microns and 400 microns.

Still preferably, there is a support surface opposed to the embossed surface 107 which, during the thrust, supports the laminar support 1 on the face opposite the first face 1*a*. Preferably, the support surface belongs to a corresponding support cylinder 110, mounted rotatably around its axis.

Preferably, the embossing cylinder 109 and the support cylinder 110 are arranged at a reciprocal distance less than the overall thickness of the laminar support 1 and the first covering layer 2, so that the aforesaid elements are compressed as a result of their passage between the two cylinders 109, 110.

Still preferably, there is provided an adjustment device for modifying the aforesaid distance depending on the thickness of the laminar support 1 employed and the pressure required for thrust.

Figure 4:
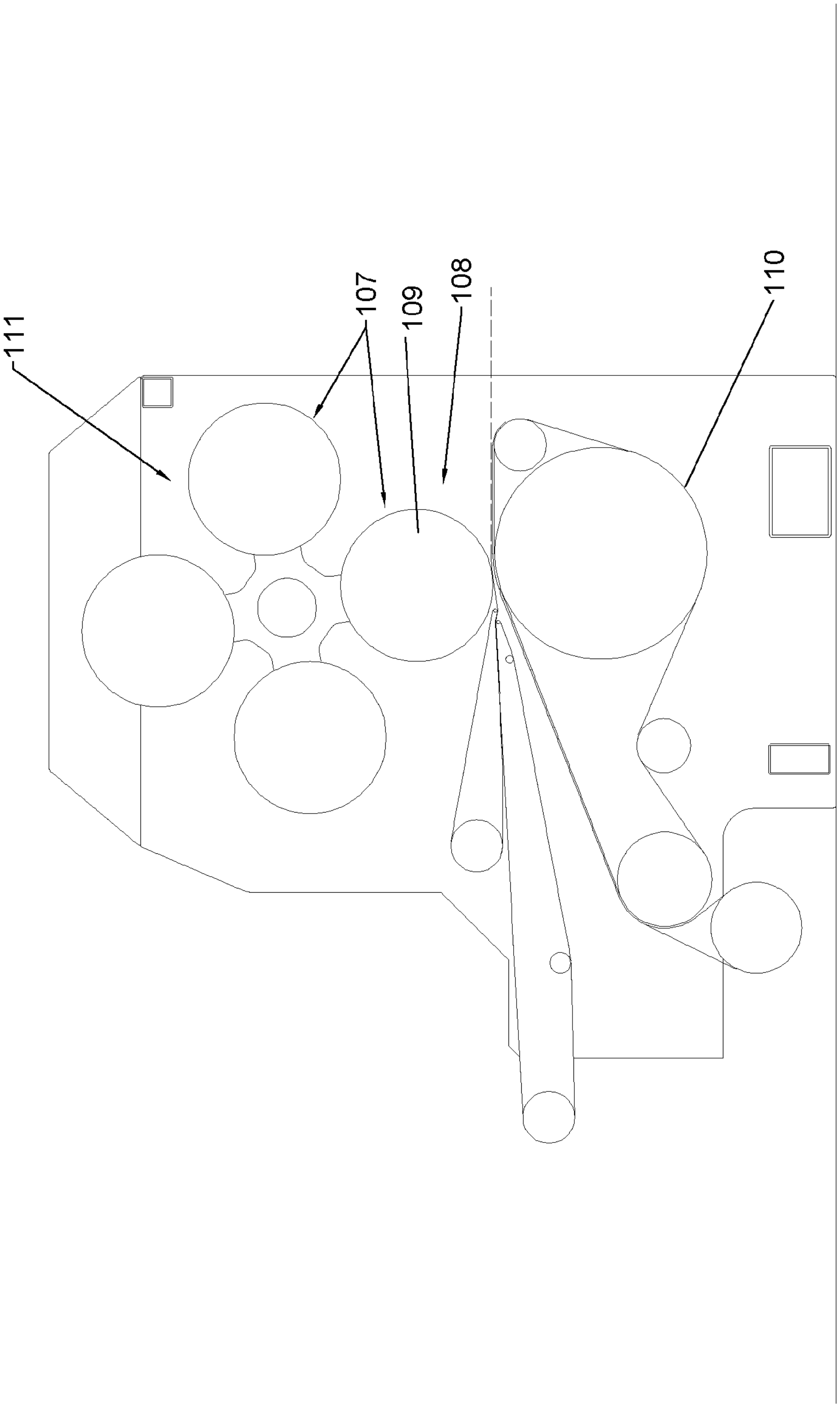
FIG. 4 represents a detail of a first embodiment variant of the plant of FIG. 3.

According to an embodiment variant of the invention, a plurality of interchangeable embossed surfaces 107, in turn provided with different surface patterns, could be provided. A possible embodiment to obtain the feature just described, represented in FIG. 4, envisages arranging a plurality of embossing cylinders 109, each with a corresponding embossed surface 107, mounted on a revolver device 111 so that they can be easily and quickly changed over if necessary. It is evident that, in embodiment variants, the number of embossing cylinders may be different from that represented in FIG. 4.

As can be seen in FIGS. 1(*d*) and 1(*e*), following or concurrently with the thrust of the embossed surface 107 against the laminar support 1, a treatment assembly 113 causes the polymerization of the first covering layer 2, so as to obtain a stabilized covering layer 5, i.e., substantially solidified, as indicated in FIG. 1(*f*). Preferably, the polymerization takes place by heating, still preferably carried out at a temperature between 60° C. and 190° C., still more preferably between 70° C. and 120° C. Advantageously, the temperature values just indicated are low enough not to significantly alter the structure of the laminar supports 1 that are commonly used in the process, in particular the leathers, which therefore retain their softness.

Still preferably, the aforesaid heating starts in contact with the embossed surface 107, to which a heating device is associated that can comprise, for example, an interspace in contact with the embossed surface 107 and a circulation device that conveys a heat transfer fluid into the interspace.

Preferably, the polymerization is completed in a polymerization furnace 114 arranged downstream of the thrust assembly 108 according to the advancement direction X, as can be seen both in FIG. 1(*f*), as regards the method, and in FIG. 3 as regards the plant 100.

Even more preferably, such a polymerization furnace 114 is a steam furnace, the operating temperature of which is set, according to the preferred embodiment of the invention, between 65° C. and 90° C., even more preferably between 75° C. and 80° C.

Figure 2:
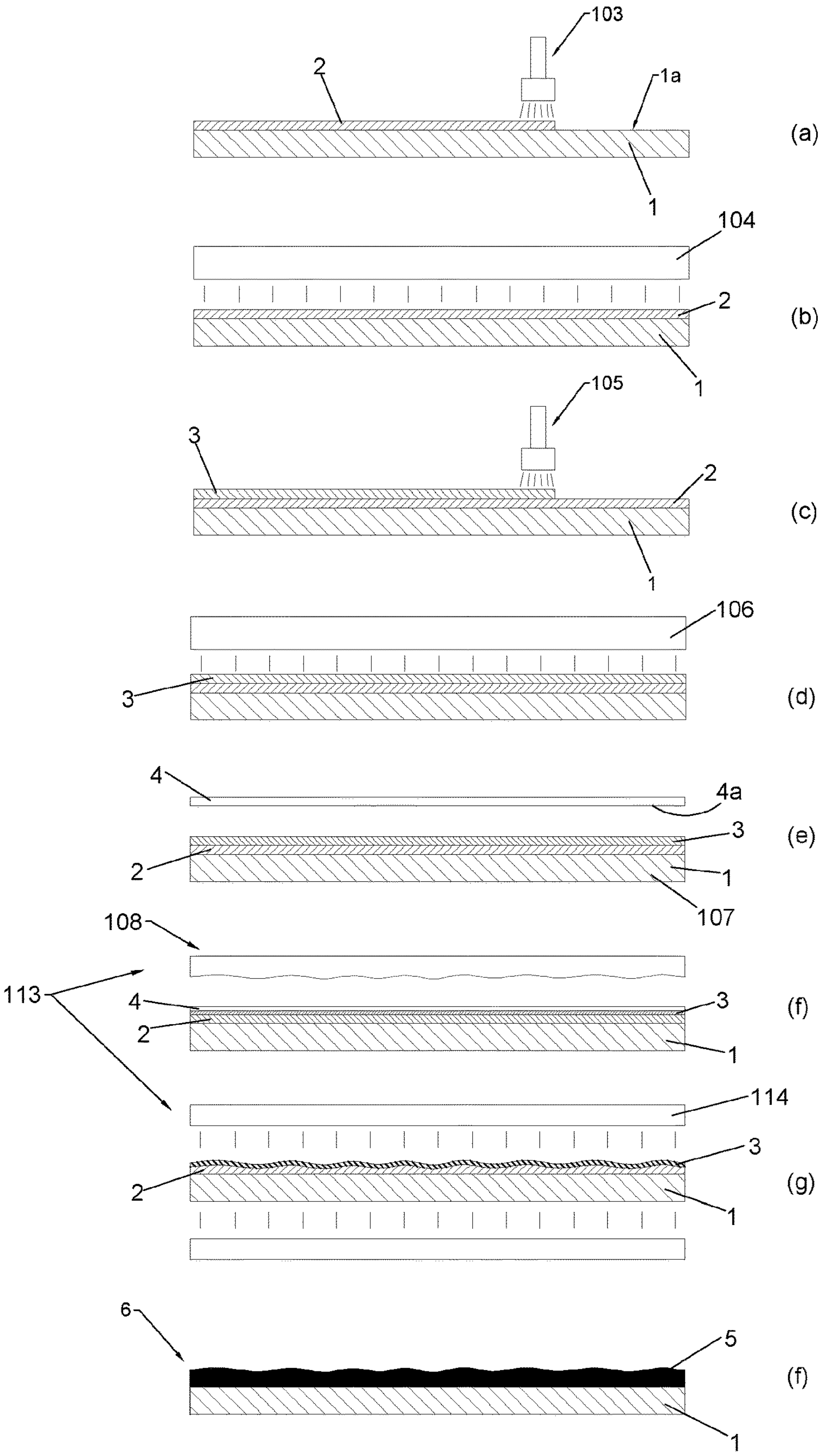
FIGS. 2(*a*)-1 (*h*) schematically represent different steps of the method of the invention according to a second preferred embodiment, in the application to a laminar support.

A second preferred embodiment of the method of the invention, the steps of which are schematically represented in FIG. 2, could provide, with respect to the method according to the first preferred embodiment, that following the aforesaid step of consolidating the first covering layer 2 and before the step of providing the laminar element 4, there is a further step of covering the first face 1*a* of the laminar support 1, as can be seen in FIG. 2(*c*), above the aforesaid first covering layer 2 that has partially consolidated, with a second covering layer 3 in non-stick material. Preferably but not necessarily, said second covering layer 3 in non-stick material is composed of a liquid or viscous substance comprising one or more polymers selected from polyurethane, silicone, ETFE, FEP, PTFE and PEEK polymers.

Alternatively, such a non-stick material could be composed of water-based or solvent-based microcellulose.

It is also evident that, in embodiment variants of the invention, any other material can be used as the second covering layer 3, provided it has the non-stick properties.

Advantageously, the fact of applying and consolidating, at least partially, said second covering layer 3 of non-stick material above the first covering layer 2 of polymer resin prevents the same resin from coming into direct contact with the embossed surface 107, risking deteriorating, or at least contaminating the latter with solidified resin residues, and at the same time avoids the need to use a paper, possibly embossed, covered with a protective layer, as in the case of the known methods.

Figure 6:
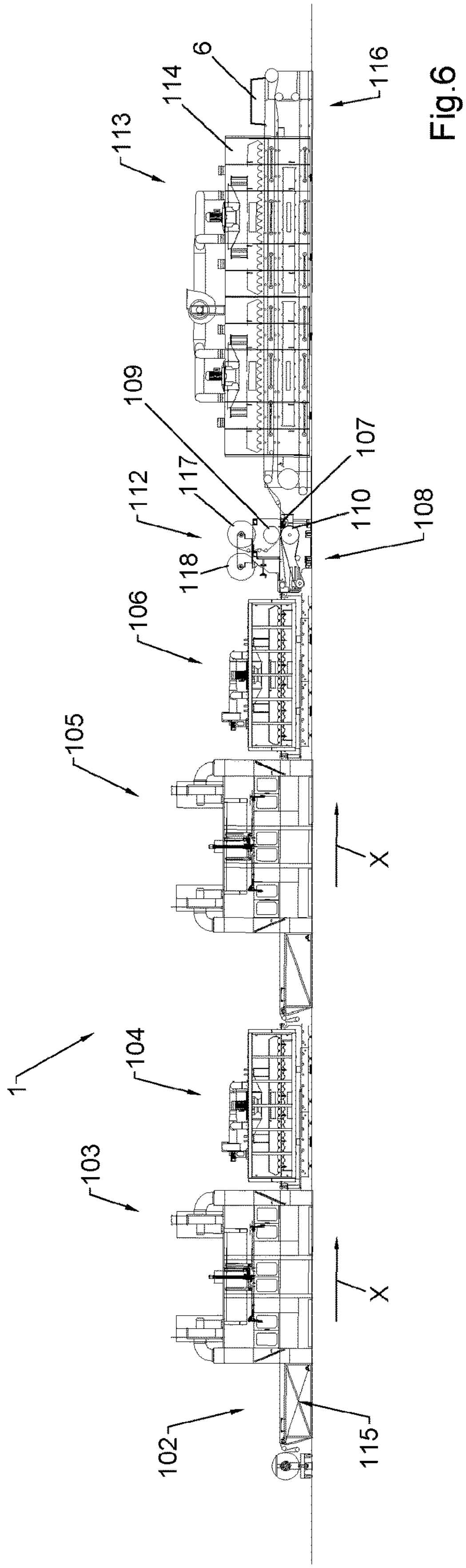
FIG. 6 represents the plant of the invention, in side view, according to the aforesaid second preferred embodiment.

Also with regard to the second covering layer 3 in non-stick material, it is deposited on the laminar support 1, preferably by spraying or by spreading with a blade or a cylinder on the first face 1*a*, as schematically represented in FIG. 2(*c*), by means of a second applicator assembly 105 belonging to the plant 200 presented in FIG. 6. The second applicator assembly 105 may comprise a series of spray nozzles arranged in a circle, which are rotated around the axis of the circle so as to intersect in succession the trajectory of the laminar support 1, or which are moved with reciprocal motion and transversely to the trajectory of the laminar support 1. Alternatively or in combination with the aforesaid spray nozzles, the second applicator assembly 105 may comprise a doctor blade for spreading the polymer resin on the first face 1*a*, above the first covering layer 2.

Preferably, the amount of the second covering layer 3 is between 1 and 6 grams per square foot and, even more preferably, is substantially equal to 3 grams per square foot.

Subsequent to said second covering, as can be seen in FIG. 2(*d*), the method of the invention also envisages consolidating the second covering layer 3, for example causing a slight polymerization thereof, to give it a more compact consistency, similar to a gel, so as to obtain a consolidated covering layer. Preferably, also in this case, consolidation takes place by heating with a second heater 106, for example a battery of infrared lamps or a ventilated dryer with diathermic oil, steam or gas heating.

This consolidation step also envisages reducing the weight per square foot of the second covering layer 3 downstream of the second heater 106 by a percentage between 35% and 55% with respect to the weight per square foot of said second covering layer 3 upstream of the second heater 106.

Advantageously, since, above the first covering layer 2, the aforesaid second covering layer 3 in non-stick material is arranged, the aforesaid first face 4*a*, when placed in contact with said second covering layer 3 in non-stick material, does not create chemical bonds with the latter, that is, does not irreversibly adhere to it, so that the laminar element 4 can be easily separated from the second covering layer 3 in non-stick material even after the latter has been polymerized, without damaging the first covering layer 2 itself.

An embodiment variant of the method of the invention with respect to the second embodiment discussed so far, could envisage performing all the steps described above, in particular in sequence the steps of covering the laminar support 1 with the first covering layer 2, the step of partial consolidation of the latter, the further step of covering with the second covering layer 3 and the step of partial consolidation of the latter, omitting however the step of providing the protective laminar element 4, above the aforesaid second covering layer 3.

This results in that the embossed surface 107 is adapted to come into direct contact with the second covering layer 3 during the pressing step.

Advantageously, the fact that the embossed surface 107 is defined directly on the pressing cylinder 109 and that between this embossed surface 107 and the first and the second covering layer 2 and 3 there is therefore no need to interpose any other element, such as the embossed paper, it avoids having the width constraints of the latter.

In general, therefore, it is understood that the method of the invention, both in the variant of FIG. 1, and in the plant 100 of FIG. 3, in which the interposition of the laminar element 4 is provided, both in the variant of FIG. 2, and in the plant 200 of FIG. 6, in which the direct contact of the embossed surface 107 with the second covering layer 3 in non-stick material is provided, achieves the purpose of allowing the processing of laminar supports 1 of any width.

Furthermore, the fact of not using any material to be interposed between the embossed surface and the second covering layer 3 or, at least, the possibility of using a low-cost material for the laminar element 4 entail the further advantage of making the application of the method of the invention and the relative plant configured to implement the aforesaid method economically advantageous.

In particular, the use of the aforesaid low-cost smooth laminar element 4, compared to the use of paper with an embossed surface, has the advantage of being able to eliminate the same laminar element 4 after use, without having to recover it for later use. This allows the laminar element 4 to be sized to withstand a single processing step and, therefore, allows its thickness to be minimized so as to further limit its cost and increase the quality of the processing.

The fact of not needing to reuse the laminar element 4 also avoids cleaning the latter, limiting the cost and overall size of the plant compared to known type plants.

Operationally, according to the first preferred embodiment of the method of the invention, the laminar support 1 is spread on the flexible element of the first feed device 102 at a loading zone 115, indicated in FIG. 3.

The first feed device 102 thus advances the laminar support 1 according to the advancement direction X and at a predefined advancement speed towards the first applicator assembly 103, where it is covered with the first covering layer 2.

The laminar support 1 thus covered is heated by the first heater 104 in order to consolidate the covering layer 2.

After this first heating operation, the laminar element 4 is arranged above the first covering layer 2, so that the laminar support 1 covered by the same first covering layer 2 is conveyed between the embossing cylinder 109 and the support cylinder 110, with interposition of the aforesaid laminar element 4. While it is conveyed, the embossed surface 107 is brought into contact with the first covering layer 2, with interposition of the laminar element 4, so as to imprint the embossing on the same first covering layer 2.

The contact angle between the laminar support 1 and the embossing cylinder 109 may vary depending on the diameter of the embossing cylinder 109, the production speed, the thickness of the first covering layer 2, so as to consolidate the embossing of the aforesaid first layer.

The contact with the surface of the embossing cylinder 109 also allows this suitably heated surface to be used to start the polymerization of the first covering layer 2.

Preferably, the contact angle between the laminar support 1 and the embossing cylinder 109 is adjustable as required by means of a special adjustment device which, for example, acts by changing the position of the support cylinder 110 according to the advancement direction X. The variation of the aforesaid contact angle entails the variation of the contact time between the laminar support 1 and the embossing cylinder 109.

Preferably, the polymerization is completed in the polymerization furnace 114 arranged downstream of the thrust assembly 108.

Finally, at the exit from the aforesaid polymerization furnace 114, it is possible to unload the multilayer laminar product 6 from an unloading zone 116.

With regard, however, to the second preferred embodiment of the invention, operatively, the laminar support 1 is spread on the flexible element of the first feed device 102 at a loading zone 115, indicated in FIG. 6.

The first feed device 102 thus advances the laminar support 1 according to the advancement direction X and at a predefined advancement speed towards the first applicator assembly 103, where it is covered with the first covering layer 2.

The laminar support 1 thus covered is heated by the first heater 104 in order to consolidate the covering layer 2.

Subsequently, the first feed device 102 advances the laminar support 1, whose first surface 1*a* is covered with the aforesaid first covering layer 2, according to the advancement direction X towards the second applicator assembly 105, where it is covered with the second covering layer 3, consisting of a non-stick material.

The laminar support 1 thus covered with the second covering layer 3 is further heated by the second heater 106, in order to consolidate the second covering layer 3.

After this second heating operation, the laminar element 4 is arranged above the second covering layer 3, so that the laminar support 1 covered by the first covering layer 2 and by the second covering layer 3 is conveyed between the embossing cylinder 109 and the support cylinder 110, with interposition of the aforesaid laminar element 4. While it is conveyed, the embossed surface 107 is brought into contact with the second covering layer 3, with interposition of the laminar element 4, so as to imprint the embossing both on the latter and on the first covering layer 2 below.

The contact angle between the laminar support 1 and the embossing cylinder 109 can vary depending on the diameter of the embossing cylinder 109, the production speed, the thickness of the two covering layers 2 and 3, so as to consolidate the embossing of the aforesaid two layers.

The contact with the surface of the embossing cylinder 109 also makes it possible to exploit this suitably heated surface to start the polymerization of the same two covering layers 2 and 3.

Preferably, the contact angle between the laminar support 1 and the embossing cylinder 109 is adjustable as required by means of a special adjustment device which, for example, acts by changing the position of the support cylinder 110 according to the advancement direction X. The variation of the aforesaid contact angle entails the variation of the contact time between the laminar support 1 and the embossing cylinder 109.

Preferably, the polymerization is completed in the polymerization furnace 114 arranged downstream of the thrust assembly 108.

Preferably, during the polymerization the second covering layer 3 adheres to the first covering layer 2 giving rise to a stabilized layer 5 in a single body, indicated in FIG. 2(*h*).

Finally, at the exit from the aforesaid polymerization furnace 114, it is possible to unload the multilayer laminar product 6 from an unloading zone 116.

From what has been said so far, it is understood that the method and the plant described above achieve all the intended objects.

In particular, the fact of using an embossed surface directly in contact with the layer to be embossed or, at least, distinct from a possible laminar element, allows the entire process to be disconnected from the embossed papers available on the market, which constrain the maximum width of the processable laminar supports.

Consequently, it is possible to realize a plant capable of processing laminar supports with widths greater than those permitted by the known technique.

Furthermore, the aim of proposing a method for producing a multilayer laminar product, the implementation of which is less expensive than similar methods belonging to the prior art, is also achieved.

The invention claimed is:

1. A method for producing a multilayer laminar product, comprising the following operations:

providing a laminar support, said laminar support being a leather or a fabric;

covering a first face of said laminar support with a first covering layer comprising a polymer resin, said covering operation covering said first face with an amount of said first covering layer in a range between 2 and 20 grams per square foot;

consolidating, at least partially, said first covering layer, said consolidation step reducing the weight per square foot of said first covering layer by a percentage in a range between 35% and 55% with respect to the weight per square foot of said first covering layer prior to said consolidation;

providing a laminar element above said first covering layer, said laminar element being of a material chosen from polyethylene, nylon or polyester with a thickness in a range between 5 microns and 50 microns, said laminar element having a smooth surface, said laminar element also being free of any protective film at its surface facing said first covering layer;

pushing an embossed surface against said laminar element that is positioned between said embossed surface and said first covering layer so that said first covering layer is imprinted with a pattern of said embossed surface;

causing a polymerization of said first covering layer so as to obtain a stabilized stabilize said first covering layer that is imprinted with said pattern.

2. The method according to claim 1, further comprising:

covering said first covering layer, at least partially consolidated, with a second covering layer comprising a non-stick material; and consolidating, at least partially, said second covering layer comprising the non-stick material before pushing said embossed surface against said laminar element.

3. The method according to claim 2, wherein said second covering layer comprising the non-stick material is composed of a liquid or viscous substance comprising one or more polymers selected from polyurethane, silicone, ETFE, FEP, PTFE or PEEK polymers.

4. The method according to claim 1, wherein said embossed surface belongs to an embossing cylinder.

5. The method according to claim 1, wherein during said step of pushing said embossed surface against said laminar element, a heating step carried out at a temperature in a range between 60° C. and 190° C., is simultaneously performed in order to start the polymerization of said first covering layer.

6. The method according to claim 1, wherein said step of causing the polymerization of said first covering layer that is imprinted with said pattern comprises heating said first covering layer by a steam furnace, whose operating temperature is set between 65° C. and 90° C.

* * * * *